United States Patent [19]
Butler

[11] Patent Number: 5,896,980
[45] Date of Patent: Apr. 27, 1999

[54] GUIDE RAIL SPLICE

[75] Inventor: Michael T. Butler, Wauwatosa, Wis.

[73] Assignee: Rexnord Corporation, Milwaukee, Wis.

[21] Appl. No.: 08/892,498

[22] Filed: Jul. 14, 1997

[51] Int. Cl.$^6$ .............................. F16B 2/06; F16B 2/22
[52] U.S. Cl. ................................. 198/836.1; 198/861.1; 403/309; 403/313
[58] Field of Search ........................... 198/836.1–836.4, 198/861.1; 403/309–311, 313

[56] References Cited

U.S. PATENT DOCUMENTS

| | | | |
|---|---|---|---|
| 2,870,740 | 1/1959 | Vogt | 403/310 |
| 4,934,516 | 6/1990 | Dugan | 198/836.4 |
| 4,958,725 | 9/1990 | Meade et al. | 198/836.1 |
| 5,123,770 | 6/1992 | Trenner | 403/310 |
| 5,626,221 | 5/1997 | Ledingham | 198/836.1 |

OTHER PUBLICATIONS

Valu Engineering, Inc., "Valu Guide", Technical Folia No. 115, Sep. 1987.
Feb. 1995 *Marbett S.p.A Catalog*, pp. 86–87, 95.
Aug. 1993 *ValuGuide New Product Bulletin*, No. 124.

*Primary Examiner*—Joseph E. Valenza
*Assistant Examiner*—Mark Deuble
*Attorney, Agent, or Firm*—Michael, Best & Friedrich

[57] ABSTRACT

A splice for joining the abutting ends of conveyor guide rails of the type having a metallic channel member and a plastic insert housed within the channel member and for engaging the product being conveyed.

3 Claims, 3 Drawing Sheets

GUIDE RAIL SPLICE

BACKGROUND OF THE INVENTION

This invention relates to conveying machines and more particularly to a splice for conveying machine guide rails.

Conveying machines generally include a moving belt or chain on which products are transported from one location to another. Guide rails are positioned along the sides of the moving belt or chain to keep the products from falling off the sides of the conveyor as they are transported.

Guide rails are commonly mounted on conveyors either by rigid fixtures or supports or by guide rail brackets. Guide rails are fabricated from a number of different materials and in various configurations. One guide rail design consists of an extruded plastic member deposed within a channel-shaped backing member formed of steel or stainless steel. The channel member includes a center section and side sections which are inclined inwardly for gripping the sides of the plastic insert and to facilitate gripping the guide rail for mounting on a conveyor. The Guide rails are preferably strong and stiff to resist side loading due to product back line pressure, but malleable enough to bend into various shapes to conform to the layout of the conveying system.

Such Guide rails are usually manufactured in ten to twenty foot lengths. As a result, the guide rail sections must be joined or spliced together wherever they meet so as to form a continuous guide rail system that provides smooth guidance of the product being conveyed. In the past, such joints were often formed by the use of a press-fit splice plate or backing plates fixed to the backside of the guide rail by welding or threaded fasteners. Press-fit splice plates were not wholly satisfactory because they did not exert sufficient force to hold the Guide rails together during surging of the product. Also, significant vibration exists in conveying systems, which tends to vibrate guide rail splice plates apart. As a result, the joint between two butted guide rails often open, resulting in damaged, downed or lost product. Moreover, fastening guide rail joints with welded back plates or threaded inserts is not only labor intensive but also expansive.

SUMMARY OF THE INVENTION

It is an object of the invention to provide a new and improved splice for conveyor guide rails.

A further object of the invention is to provide a splice for conveyor guide rails with sufficient holding strength to prevent the rail ends from separating under product loading.

Another object of the invention is to provide a splice for conveyor guide rails which is easy to attach.

A still further object of the invention is to provide a splice for conveyor guide rails which does not shake loose as a result of vibrations.

These and other objects and advantages of the present invention will become more apparent from the detailed description thereof taken with the accompanying drawings.

In general terms, the invention comprises a splice for joining the abutting ends of conveyor guide rails of the type having a metallic channel member and a plastic insert deposed within the channel member for engaging the product being conveyed and wherein the metallic channel member has a central section and a pair of side sections which extend inwardly from the central section at a first acute angle. The splice comprises a first member having a base and a side section inclined inwardly from the base at a second acute angle to define inside and outside surfaces and a second member having a base and a side section inclined inwardly from the base at a third acute angle to define inside and outside surfaces. Fastening means are provided for tightening the first and second members on to the abutting ends of guide rail sections. At least one of the second and third acute angles is less than the first acute angle so that the side sections of the first and second members tightly grip the channel member when the fastening means is tightened.

DETAILED DESCRIPTION OF THE PREFERRED EMBODIMENT

Figure 1:
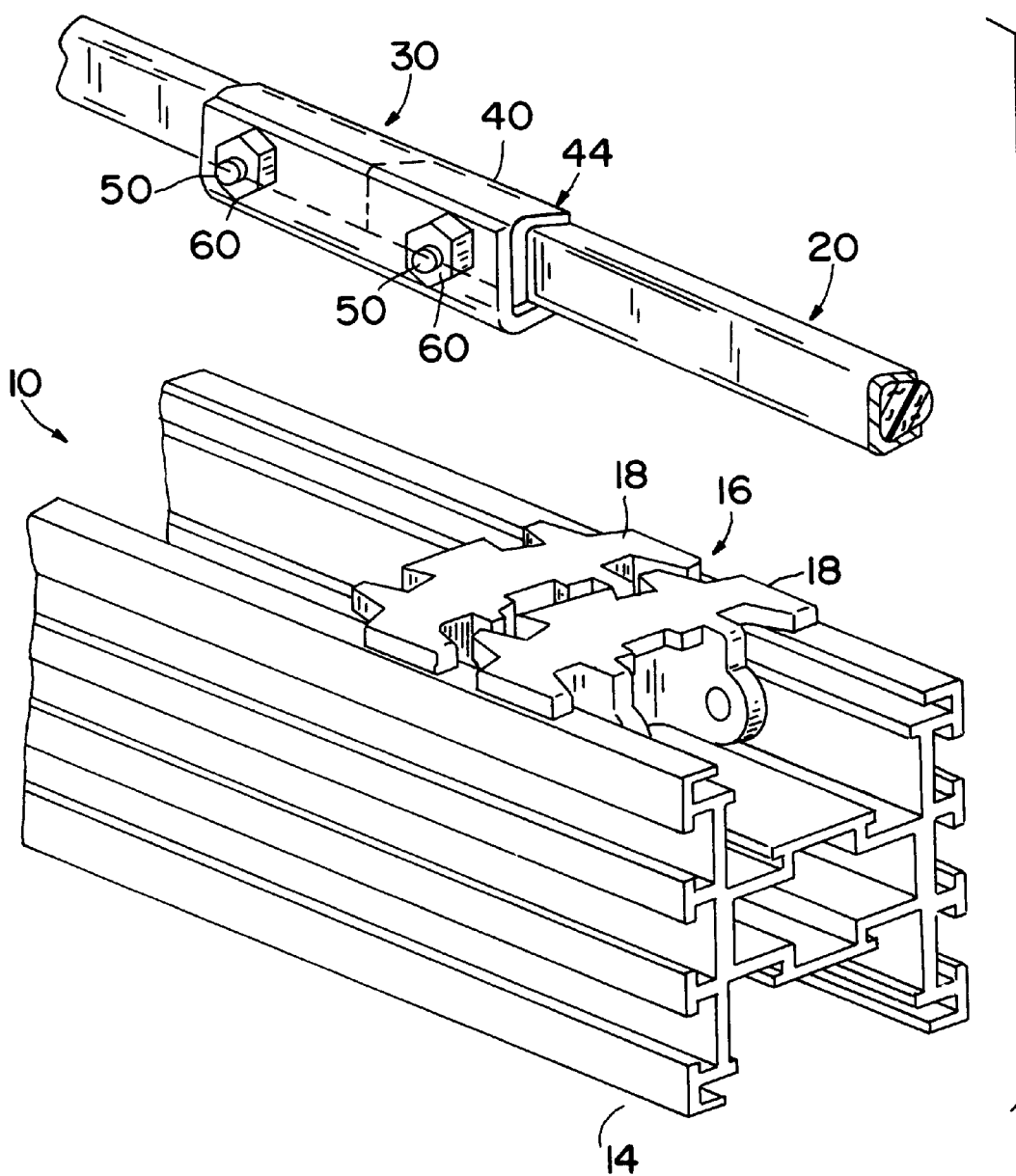
FIG. 1 is a perspective view showing a portion of a conveyor having guide rails which are joined with the splice according to the preferred embodiment of the invention.

FIG. 1 shows a portion of a conveyor assembly 10 incorporating a guide rail splice in accordance with the preferred embodiment of the invention. The conveyor 10 includes a frame assembly 14 for supporting a conveyor belt or chain 16 upon which products being conveyed are carried. While any suitable belt or chain may be employed, in the illustrated example, the chain 16 has a plurality of links 18, only two of which are shown. The links are coupled to each other at their opposite ends by hinge pins (not shown). The chain 16 is moved over the guide rail supports by a chain drive and sprockets coupled to a power source (not shown). Guide rails 20 are supported adjacent to and on the opposite sides of the chain 16 to prevent the products being conveyed from falling off the conveyor 10. Because the conveyor frame assembly 14, the chain 18 and the chain drive are conventional, they will not be discussed in detail for the sake of brevity. Also, the illustrated conveyor assembly 10 is intended as an example only, it being understood that the invention may be employed with other types of conveyors as well.

The guide rails 20 consist of elongate members which are fabricated in ten or twenty foot lengths. A splice 30, according to the preferred embodiment of the invention, is provided for joining the abutting ends of the ten or twenty foot sections into a continuous guide rail.

Figure 2:
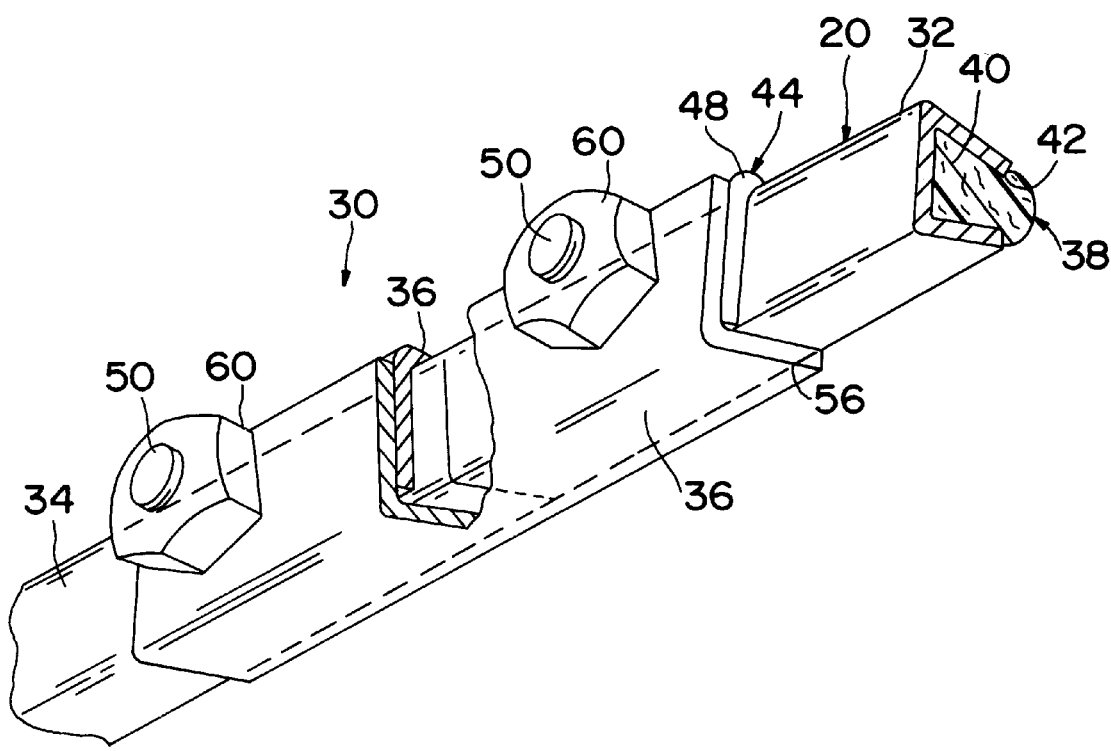
FIG. 2 is a perspective view of a guide rail splice according to the preferred embodiment of the invention.
Figure 3:
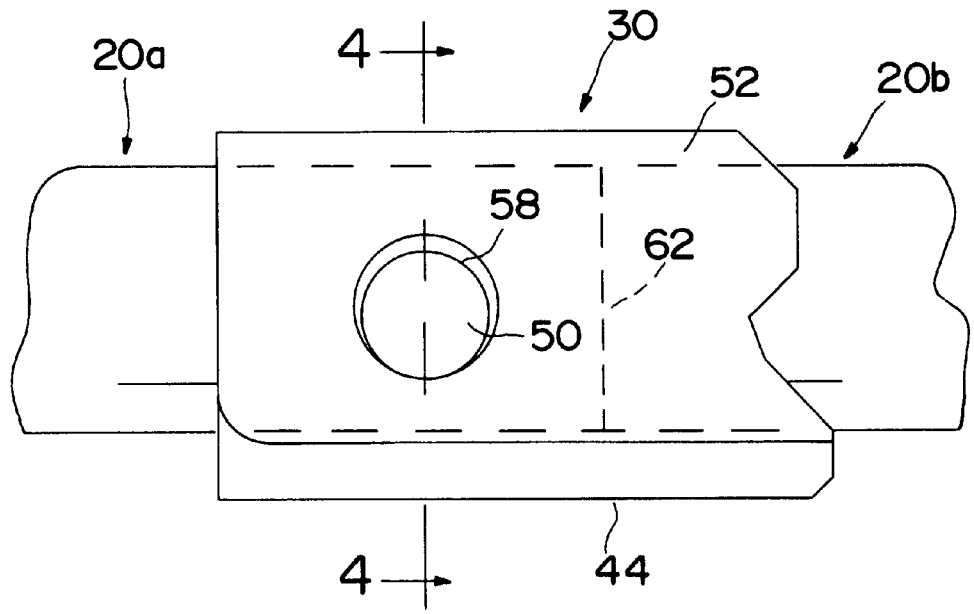
FIG. 3 is a top plan view of a portion of the guide rail splice shown in FIG. 2.
Figure 4:
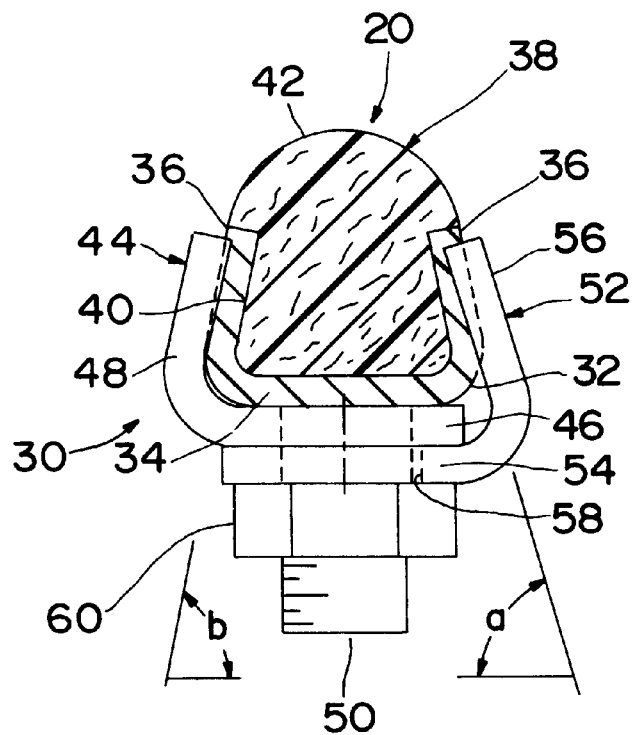
FIG. 4 is a view taken along lines 4—4 of FIG. 3.

The guide rail 20 is shown more particularly in FIGS. 2—4 to include a metallic channel member 32 having a center section 34 and side sections 36. The channel member 32 may be formed of any suitable materials such a steel or stainless steel depending upon its application. The side sections 36 of the channel member 32 extend inwardly such that their inner surfaces form an acute angle b with the inner surface of the center section 34.

The guide rail 20 also includes a plastic insert 38 having a stem portion 40 those outer surface is complimentary to the inner surface of the channel member 32 and a head portion 42 configured for engaging the product being conveyed. The configuration of the head portion 42 is determined by the amount of contact desired between the conveyed product and the plastic insert 38. The round configuration shown in FIG. 4 provides minimum contact while a flat or extended face provides greater contact. The insert 38 is normally formed of a high molecular weight plastic material which provides minimum friction with the conveyed products.

The splice 30 comprises a first member 44 having a base section 46 and a side section 48 which is inclined inwardly at an angle which is equal to or slightly less than the angle b formed by the center and side sections of the channel member 32. A pair of threaded studs 50 extend perpendicularly in a parallel, spaced relation from the base of the member 44.

The splice 30 also includes a second member 52 which also comprises a base of 54 and a side section 56. The angle formed between the inner surfaces of the base 54 and side section 56 is equal to an angle a which is less than the angle b formed between the inner surfaces of the center and side sections of the channel member 32. The base 54 of member 52 has a pair of openings 58 which are slightly larger than the diameter of the studs 50 and spaced apart a distance equal to that between the studs 50 so that the member 52 may be received over the member 44 with the studs 50 passing through the holes 58. Nuts 60 are threadably received on studs 50.

In assembly, the splice 30 is placed in an overlapping relation over a joint 62 between the abutting ends of a pair of guide rail sections 20a and 20b as shown in FIG. 3. The nuts 60 are then tightened forcing the base 54 of member 52 against the base 46 of member 44. Because the inside angle a of the member 52 is less than the inside angle b formed by the center and side sections of the guide rail 20, the side section 56 of member 52 presses inwardly against the sides of the guide rail to provide firm clamping engagement.

Preferably, the joint 62 is positioned at the center of the splice 30 so that the gripping action on both guide rail sections 20a and 20b is substantially equal. As the nuts 60 are tightened, a load is applied to the base 54 member 52 forcing the bases 54 and 46 into a parallel relation. As this occurs, the side sections 48 and 56 of the members 44 and 52, respectively, are drawn toward each other to clamp the guide rail sections 20a and 20b. This is accomplished by the relative positioning of the stud 50 and the hole 58 in relation to their respective angular surfaces and causes a clamping or binding action between the members 44 and 52. The splice 30 securely fastens to the butt joint 62 between the guide rail sections 20a and 20b. Because the members 44 and 52 are relatively thicker in section than the guide rail channel 32, the clamping action can cause some deflection in any or all of the members 44 and 52 and the side sections of the channel member 32. This provides not only a flush fit but also a fit that is subject to some preload. This preload acts to better absorb any vibrations transmitted to the guide rail 20 from the product being conveyed thereby resisting any tendency to loosen with time.

The splice according to the preferred embodiment of the invention is easy to install thereby reducing assembly time. This assembly can be done either by mounting the splice 30 on one guide rail section such as 20a and then inserting the other section 20b or forming the butt joint 62 between the guide rail sections and then applying the splice. Because the splice 30 is attached directly to the joint 62, the splice can be used as an alignment tool to ensure that the guide rail 20 is continuous and smooth.

While only a single embodiment of the invention has been illustrated and described, it is not intended to be limited thereby but only by the scope of the appended claims.

I claim:

1. A splice for conveyor guide rails, the conveyor guide rails having a central section and a pair of oppositely facing sides, both sides extending inwardly from the central section at respective first angles, said splice comprising:

a first member having a base and a side section connected to said base at a second angle with respect to said base of said first member;

a second member having a base positionable in stacked nesting relation to said base of said first member, said second member having a side section connected to said base of said second member at a third angle with respect to said base of said second member;

at least one of said second and third angles being less than the first angles;

a longitudinal member having an axis extending through the central section of the conveyor guide rail and between the sides of the conveyor guide rail, the longitudinal member being affixed to said base of said first member and extending through said base of said second member; and a fastener engaging said longitudinal member and axially clamping said base of said second member into pressure engagement with said base of said first member.

2. The splice set forth in claim 1 wherein said first, second and third angles are acute angles.

3. The splice set forth in claim 1 wherein the guide rails comprise a metallic channel member having side walls and a plastic insert received between said side walls, said first and second members being formed of a metallic material, at least one of said side walls and said first and second members deforming when said second base is forced against the first base to preload said splice.

* * * * *